(12) United States Patent
Park et al.

(10) Patent No.: US 11,463,635 B2
(45) Date of Patent: Oct. 4, 2022

(54) IMAGE SENSING DEVICE AND OPERATING METHOD THEREOF

(71) Applicant: SK hynix Inc., Gyeonggi-do (KR)

(72) Inventors: Yu Jin Park, Gyeonggi-do (KR); Han Sang Kim, Gyeonggi-do (KR); Kang Bong Seo, Gyeonggi-do (KR); Jeong Eun Song, Gyeonggi-do (KR); Min Seok Shin, Gyeonggi-do (KR); Jung Soon Shin, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/996,338

(22) Filed: Aug. 18, 2020

(65) Prior Publication Data

US 2021/0289152 A1 Sep. 16, 2021

(30) Foreign Application Priority Data

Mar. 16, 2020 (KR) ........................ 10-2020-0031893

(51) Int. Cl.
| | | |
|---|---|---|
| *H04N 5/335* | (2011.01) | |
| *H04N 5/355* | (2011.01) | |
| *H04N 5/378* | (2011.01) | |
| *H04N 5/38* | (2006.01) | |

(52) U.S. Cl.
CPC ............ *H04N 5/355* (2013.01); *H04N 5/378* (2013.01); *H04N 5/38* (2013.01)

(58) Field of Classification Search
CPC .......... H04N 5/355; H04N 5/378; H04N 5/38; H04N 5/37452; H04N 5/3559; H01L 27/14609; G01S 17/894; G01S 17/34; G01S 17/10; G01S 7/4865; G01S 7/4816; G01S 7/4863

See application file for complete search history.

(56) References Cited

U.S. PATENT DOCUMENTS

| | | |
|---|---|---|
| 7,157,685 B2 | 1/2007 | Bamji et al. |
| 7,176,438 B2 | 2/2007 | Bamji et al. |
| 7,321,111 B2 | 1/2008 | Bamji et al. |

(Continued)

FOREIGN PATENT DOCUMENTS

| | | |
|---|---|---|
| KR | 10-2011-0051391 | 5/2011 |
| KR | 10-2016-0021591 | 2/2016 |

OTHER PUBLICATIONS

Bamji et al., 1Mpixel 65nm BSI 320MHz Demodulated TOF Image Sensor with 3.5μm Global Shutter Pixels and Analog Binning, ISSCC 2018, Feb. 2018, p. 94-p. 95, IEEE, San Francisco, CA, USA.

(Continued)

*Primary Examiner* — Kelly L Jerabek
(74) *Attorney, Agent, or Firm* — IP & T Group LLP (57) ABSTRACT

Disclosed is an image sensing device and an operating method thereof, and the image sensing device may include a light detection circuit coupled between a low voltage terminal and a first node, a first transmission circuit coupled between the first node and a second node, a storage circuit coupled between the second node and a third node, a first coupling circuit coupled between the third node and a high voltage terminal, a second transmission circuit coupled between the third node and the first node, and a second coupling circuit coupled between the second node and the high voltage terminal.

20 Claims, 6 Drawing Sheets

(56) References Cited

U.S. PATENT DOCUMENTS

| | | | |
|---|---|---|---|
| 7,507,947 | B2 | 3/2009 | Bamji et al. |
| 8,648,998 | B2 | 2/2014 | Van Nieuwenhove et al. |
| 10,027,910 | B2 | 7/2018 | Bulteel et al. |
| 2017/0034464 | A1 | 2/2017 | Dielacher et al. |
| 2017/0142393 | A1* | 5/2017 | Oggier ................. H04N 13/128 |
| 2017/0343675 | A1* | 11/2017 | Oggier .................... G01S 17/42 |
| 2018/0124372 | A1* | 5/2018 | Yang .................... H04N 13/239 |
| 2019/0391238 | A1* | 12/2019 | Barnes ................. H04N 5/2256 |

OTHER PUBLICATIONS

Cho et al., A 3-D Camera With Adaptable Background Light Suppression Using Pixel-Binning and Super-Resolution, IEEE Journal of Solid-State Circuits, Oct. 2014, p. 2319-p. 2332, vol. 49, IEEE.

Bamji et al., A 0.13 μm CMOS System-on-Chip for a 512×424 Time-of-Flight Image Sensor With Multi-Frequency Photo-Demodulation up to 130 MHz and 2 GS/s ADC, IEEE Journal of Solid-State Circuits, Jan. 2015, p. 303-p. 319, vol. 50, IEEE.

Hsu et al., A CMOS Time-of-Flight Depth Image Sensor With In-Pixel Background Light Cancellation and Phase Shifting Readout Technique, IEEE Journal of Solid-State Circuits, Oct. 2018, p. 2898-p. 2905, vol. 53, IEEE.

Kato et al., 320×240 Back-Illuminated 10-μm CAPD Pixels for High-Speed Modulation Time-of-Flight CMOS Image Sensor, IEEE Journal of Solid-State Circuits, Apr. 2018, p. 1071-p. 1078, vol. 53, IEEE.

Park et al., A 64×64 APD-Based ToF Image Sensor with Background Light Suppression up to 200 klx Using In-Pixel Auto-Zeroing and Chopping, 2019 Symposium on VLSI Circuits Digest of Technical Papers, Jun. 2019, pp. C256-C257, IEEE, Kyoto, Japan.

\* cited by examiner

IMAGE SENSING DEVICE AND OPERATING METHOD THEREOF

CROSS-REFERENCE TO RELATED APPLICATION(S)

This application claims priority under 35 U.S.C. § 119 to Korean Patent Application No. 10-2020-0031893, filed on Mar. 16, 2020, the disclosure of which is incorporated herein by reference in its entirety.

BACKGROUND

1. Field

Various embodiments of the present disclosure relate to a semiconductor design technique, and more particularly, to an image sensing device and an operating method thereof.

2. Description of the Related Art

Image sensing devices capture images using the property of a semiconductor which reacts to light. Image sensing devices may be roughly classified into charge-coupled device (CCD) image sensing devices and complementary metal-oxide semiconductor (CMOS) image sensing devices. Recently, CMOS image sensing devices are widely used because CMOS image sensing devices allow both analog and digital control circuits to be directly implemented on a single integrated circuit (IC).

SUMMARY

Various embodiments of the present disclosure are directed to an image sensing device that may easily remove background light when generating a depth information signal based on a time of flight (ToF) technology, and an operating method of the image sensing device.

In accordance with an embodiment, an image sensing device may include: a light detection circuit coupled between a low voltage terminal and a first node; a first transmission circuit coupled between the first node and a second node, and suitable for transmitting first charges, which are generated from the light detection circuit, to the second node during a first time period in which emitted light is emitted to a subject; a storage circuit coupled between the second node and a third node; a first coupling circuit coupled between the third node and a high voltage terminal, and suitable for electrically coupling the high voltage terminal to the third node during the first time period; a second transmission circuit coupled between the third node and the first node, and suitable for transmitting second charges, which are generated from the light detection circuit, to the third node during a second time period in which the emitted light is not emitted to the subject; and a second coupling circuit coupled between the second node and the high voltage terminal, and suitable for electrically coupling the high voltage terminal to the second node during the second time period.

The storage circuit may store the first charges during the first time period, and subtract the second charges from the first charges during the second time period after the first time period.

The first charges may correspond to reflected light, which is reflected from the subject, and background light, which is present in the periphery of the subject, and the second charges may correspond to the background light.

In accordance with an embodiment, an image sensing device may include: a light emitter enabled during a first time period of first and second time periods, and suitable for emitting emitted light to a subject during the first time period; a light receiver enabled during the first and second time periods, and suitable for receiving first incident light during the first time period and second incident light during the second time period; and at least one pixel suitable for generating a pixel signal based on first charges corresponding to the first incident light and second charges corresponding to the second incident light.

The pixel may subtract the second charges from the first charges, and generate the pixel signal based on third charges corresponding to a subtraction result.

The first charges may correspond to reflected light, which is reflected from the subject, and background light, which is present in the periphery of the subject, and the second charges may correspond to the background light.

In accordance with an embodiment, an operating method of an image sensing device may include: transmitting first charges, which are generated from a light detection circuit, from a first node to a second node during a first time period, of an integration time period, in which emitted light is emitted to a subject; storing the first charges, which are transmitted to the second node, in a storage circuit; transmitting second charges, which are generated from the light detection circuit, to a third node during a second time period, of the integration time period, in which the emitted light is not emitted to the subject; and subtracting the second charges, which are transmitted to the third node, from the first charges stored in the storage circuit.

The first charges may correspond to reflected light, which is reflected from the subject, and background light, which is present in the periphery of the subject, and the second charges may correspond to the background light.

In accordance with an embodiment, an image sensing device may include: an emitter suitable for emitting light toward a subject during a first segment of time; a receiver suitable for receiving incident light, which includes emitted light reflected from the subject, during the first segment of time and for receiving background light during a second segment of time; and a pixel suitable for generating a pixel signal by decreasing charges corresponding to the incident light by an amount of charges corresponding to the background light

DETAILED DESCRIPTION

Various embodiments are described below with reference to the accompanying drawings to enable those with ordinary skill in art to which the present disclosure pertains to practice the present invention. Throughout the specification, reference to "an embodiment" or the like is not necessarily to only one embodiment, and different references to any such phrase are not necessarily to the same embodiment(s).

It will be understood that when an element is referred to as being "connected to" or "coupled to" another element, it may be directly on, connected to or coupled to the other element, or one or more intervening elements may be present. In addition, it will also be understood that the terms "comprises," "comprising," "includes," and "including" when used in this specification, specify the presence of the stated elements and do not preclude the presence or addition of one or more other elements. Throughout the specification, an element or step represented in the singular, i.e., an element or a step, does not necessarily mean that there is only one such element or step; there may be more than one such element or step.

Figure 1:
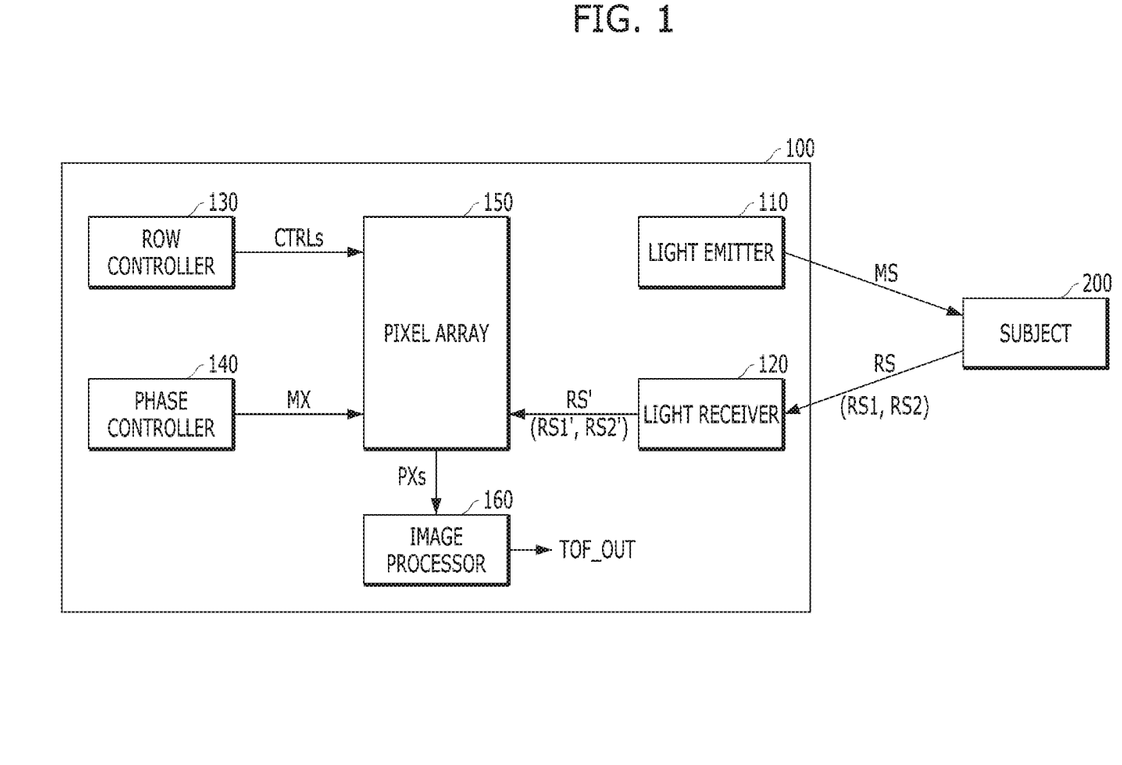
FIG. 1 is a block diagram illustrating an image sensing device in accordance with an embodiment.

FIG. 1 is a block diagram illustrating an image sensing device 100 in accordance with an embodiment.

Referring to FIG. 1, the image sensing device 100 may generate a depth information signal TOF_OUT indicating a distance, i.e., a depth, from a subject (or object) 200 by means of a time of flight (ToF) method. For example, the image sensing device 100 may generate the depth information signal TOF_OUT by detecting a phase difference between light that is emitted from the image sensing device 100 (emitted light MS) and light from the subject 200 that is incident on the image sensing device 100 (incident light RS).

For example, the image sensing device 100 may include a light emitter 110, a light receiver 120, a row controller 130, a phase controller 140, a pixel array 150 and an image processor 160.

The light emitter 110 may be enabled during an emission time, i.e., a first time period, of an integration time period. The light emitter 110 may emit the emitted light MS to the subject 200 during the emission time period. For example, the emitted light MS may be a periodic signal that periodically toggles.

The light receiver 120 may be enabled during the emission time period and a reception time, i.e., a second time period, of the integration time period. The light receiver 120 may receive the incident light RS during the emission and reception time periods. Hereinafter, the incident light RS received during the emission time period is referred to as first incident light RS1, and the incident light RS received during the reception time period is referred to as second incident light RS2. The first incident light RS1 may include emitted light MS that is reflected from the subject 200 and received by the light receiver 120 and background light that is present on or near the periphery of the subject 200. The second incident light RS2 may include only the background light.

The row controller 130 may generate a plurality of row control signals CTRLs for controlling respective rows of the pixel array 150. For example, the row controller 130 may generate first row control signals for controlling pixels arranged in a first row of the pixel array 150, and generate nth row control signals for controlling pixels arranged in an nth row of the pixel array 150, where "n" is a natural number greater than 2.

The phase controller 140 may be enabled during the emission and reception time periods of the integration time period. The phase controller 140 may generate a control signal MX that periodically toggles during the emission time period and the reception time period. For example, the control signal MX may have the same phase and period as the emitted light MS.

The pixel array 150 may generate a plurality of pixel signals PXs based on received incident light RS', the plurality of row control signals CTRLs and the control signal MX. The received incident light RS' may include first received incident light RS1' corresponding to the first incident light RS1 and second received incident light RS2' corresponding to the second incident light RS2, The pixel array 150 may include at least one unit pixel for measuring the depth from the subject 200. For example, the unit pixel may include a pair of pixels. The pair of pixels may be selected based on the plurality of row control signals CTRLs, and generate first and second pixel signals PX1 and PX2 based on the control signal MX, the first received incident light RS1' and the second received incident light RS2'. The unit pixel is described in more detail with reference to FIG. 2.

The image processor 160 may generate the depth information signal TOF_OUT indicating the depth from the subject 200, based on the plurality of pixel signals PXs. For example, the image processor 160 may generate the depth information signal TOF_OUT by performing a subtraction operation on the first and second pixel signals PX1 and PX2.

Figure 2:
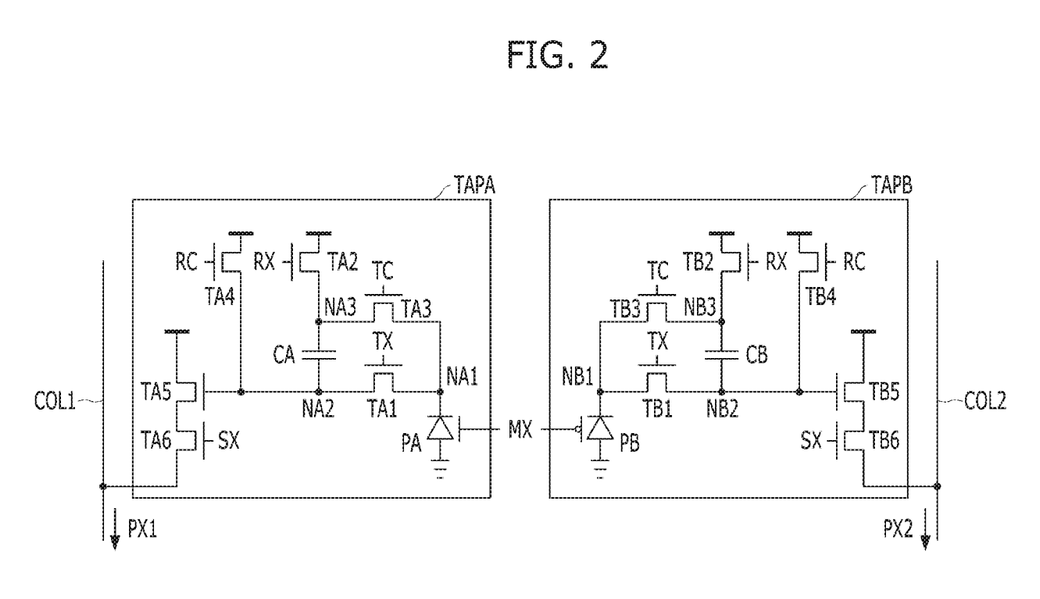
FIG. 2 is a circuit diagram illustrating a unit pixel of a pixel array, such as that illustrated in FIG. 1.

FIG. 2 is a circuit diagram illustrating the unit pixel illustrated in FIG. 1.

Referring to FIG. 2, the unit pixel may include a pair of pixels. The pair of pixels may include a first pixel TAPA and a second pixel TAPB. For example, the first and second pixels TAPA and TAPB may be arranged adjacent to each other in the same row.

The first pixel TAPA may generate the first pixel signal PX1 based on a first transmission signal TX, a second transmission signal TC, a reset signal RX, a coupling signal RC, a selection signal SX and the control signal MX. The first transmission signal TX, the second transmission signal TC, the reset signal RX, the coupling signal RC and the selection signal SX may be included in the plurality of row control signals CTRLs described above. The first pixel TAPA may include a sensing circuit PA, a first transmission circuit TA1, a charge storage circuit CA, a first coupling circuit TA2, a second transmission circuit TA3, a second coupling circuit TA4, a driving circuit TA5 and a selection circuit TA6.

The sensing circuit PA may be coupled between a first node NA1 and a low voltage terminal. The sensing circuit PA may generate first charges corresponding to the first received incident light RS1', based on the control signal MX during the emission time period. The sensing circuit PA may generate second charges corresponding to the second received incident light RS2', based on the control signal MX during the reception time period. For example, the sensing circuit PA may include photodiode.

The first transmission circuit TA1 may be coupled between the first node NA1 and a second node NA2. The first transmission circuit TA1 may be enabled during a reset time period, i.e., a fourth time period, and the emission time period based on the first transmission signal TX, and electrically couple the first node NA1 to the second node NA2. The reset time period may occur before the integration time period. The first transmission circuit TA1 may electrically couple the first node NA1 to the second node NA2 during the reset time period, thereby providing an environment in which the sensing circuit PA, the charge storage circuit CA and the second node NA2 can be reset. The first transmission circuit TA1 may electrically couple the first node NA1 to the second node NA2 during the emission time period, thereby transmitting the first charges, which are generated from the sensing circuit PA, to the charge storage circuit CA through the second node NA2. For example, the first transmission circuit TA1 may include an NMOS transistor having a gate terminal to which the first transmission signal TX is inputted and a source terminal and a drain terminal coupled between the first node NA1 and the second node NA2.

The charge storage circuit CA may be coupled between the second node NA2 and a third node NA3. The charge storage circuit CA may store the first charges during the emission time. The charge storage circuit CA may subtract the second charges from the first charges during the reception time. For example, the charge storage circuit CA may include a capacitor.

The first coupling circuit TA2 may be coupled between a high voltage terminal and the third node NA3. The first coupling circuit TA2 may be enabled during the reset time period and the emission time period based on the reset signal RX, and electrically couple the high voltage terminal to the third node NA3. The first coupling circuit TA2 may electrically couple the high voltage terminal to the third node NA3 during the reset time period, thereby resetting the sensing circuit PA, the charge storage circuit CA and the second node NA2. The first coupling circuit TA2 may electrically couple the high voltage terminal to the third node NA3 during the emission time period, thereby providing an environment in which the first charges can be transmitted to the charge storage circuit CA, that is, one terminal of the charge storage circuit CA. For example, the first coupling circuit TA2 may include an NMOS transistor having a gate terminal to which the reset signal RX is inputted and a source terminal and a drain terminal coupled between the high voltage terminal and the third node NA3.

The second transmission circuit TA3 may be coupled between the first node NA1 and the third node NA3. The second transmission circuit TA3 may be enabled during the reset time period and the reception time period based on the second transmission signal TC, and electrically couple the first node NA1 to the third node NA3. The second transmission circuit TA3 may electrically couple the first node NA1 to the third node NA3 during the reset time period, thereby providing an environment in which the sensing circuit PA, the charge storage circuit CA and the second node NA2 can be reset. The second transmission circuit TA3 may electrically couple the first node NA1 to the third node NA3 during the reception time period, thereby transmitting the second charges, which are generated from the sensing circuit PA, to the charge storage circuit CA through the third node NA3. For example, the second transmission circuit TA3 may include an NMOS transistor having a gate terminal to which the second transmission signal TC is inputted and a source terminal and a drain terminal coupled between the first node NA1 and the third node NA3.

The second coupling circuit TA4 may be coupled between the high voltage terminal and the second node NA2. The second coupling circuit TA4 may be enabled during the reception time period based on the coupling signal RC, and electrically couple the high voltage terminal to the second node NA2. The second coupling circuit TA4 may electrically couple the high voltage terminal to the second node NA2 during the reception time period, thereby providing an environment in which the second charges can be transmitted through or across the charge storage circuit CA. For example, the second coupling circuit TA4 may include an NMOS transistor having a gate terminal to which the coupling signal RC is inputted and a source terminal and a drain terminal coupled between the high voltage terminal and the second node NA2.

The driving circuit TA5 may be coupled between the high voltage terminal and the selection circuit TA6. The driving circuit TA5 may drive a first column line COL1 with a high voltage, which is supplied through the high voltage terminal, based on a voltage loaded on the second node NA2. For example, the driving circuit TA5 may include an NMOS transistor having a gate terminal coupled to the second node NA2 and a source terminal and a drain terminal coupled between the high voltage terminal and the selection circuit TA6.

The selection circuit TA6 may be coupled between the driving circuit TA5 and the first column line COL1 The selection circuit TA6 may be enabled during a readout time period, i.e., a third time period, based on the selection signal SX, and electrically couple the driving circuit TA5 to the first column line COL1. The selection circuit TA6 may output the first pixel signal PX1, which corresponds to the voltage loaded on the second node NA2, through the first column line COLT during the readout time period.

The second pixel TAPB may generate the second pixel signal PX2 through a second column line COL2 based on a first transmission signal TX, a second transmission signal TC, a reset signal RX, a coupling signal RC, a selection signal SX and the control signal MX, For example, the second pixel TAPB may include a sensing circuit PB, a first transmission circuit TB1, a charge storage circuit CB, a first coupling circuit TB2, a second transmission circuit TB3, a second coupling circuit TB4, a driving circuit TB5 and a selection circuit TB6.

Since the sensing circuit PB, the first transmission circuit TB1, the charge storage circuit CB, the first coupling circuit TB2, the second transmission circuit TB3, the second coupling circuit TB4, the driving circuit TB5 and the selection circuit TB6 are the same as the sensing circuit PA, the first transmission circuit TA1, the charge storage circuit CA, the first coupling circuit TA2, the second transmission circuit TA3, the second coupling circuit TA4, the driving circuit TA5 and the selection circuit TA6 included in the first pixel TAPA, description thereon is omitted here. However, the sensing circuit PB may operate based on an inverted signal of the control signal MX or a signal having a phase difference of 180 degrees relatively to the control signal MX.

Hereinafter, an operation of the image sensing device 100 in accordance with the present embodiment, which has the above-described configuration, is described. For convenience in description, only an operation related to the first pixel TAPA is described in the present embodiment.

Figure 3:
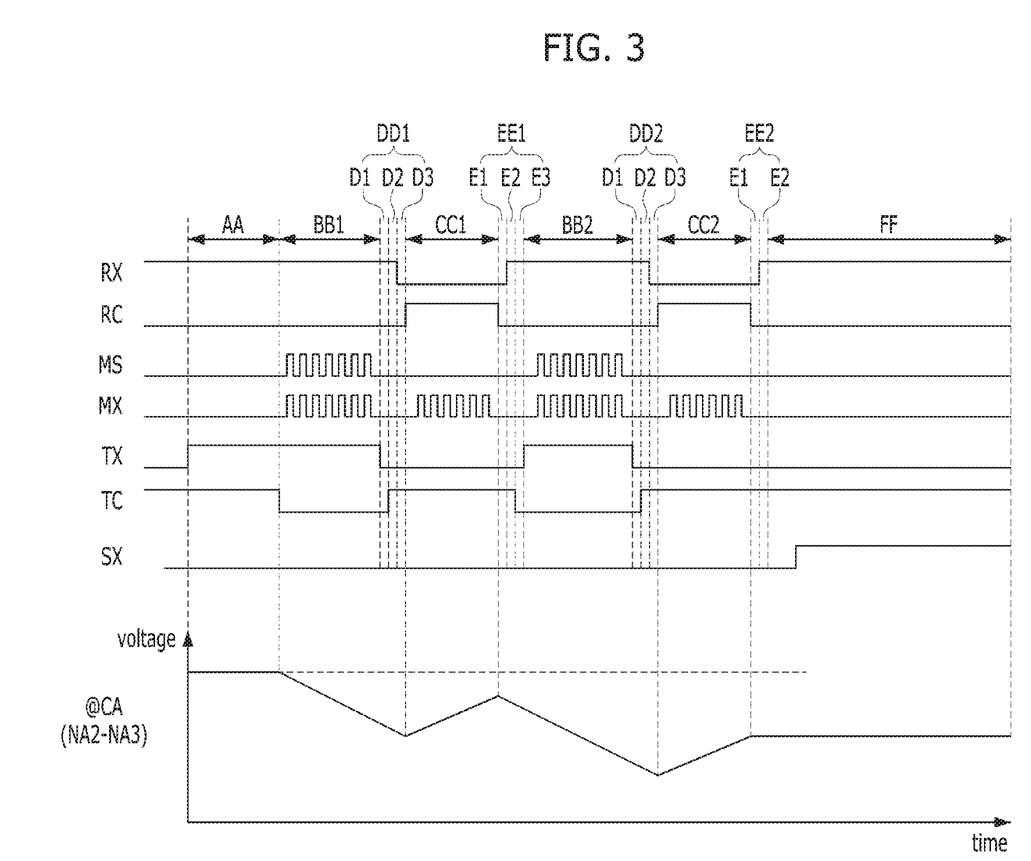
FIG. 3 is a timing diagram illustrating an operation of an image sensing device, such as that illustrated in FIG. 1.

FIG. 3 is a timing diagram illustrating the operation of the image sensing device 100 illustrated in FIG. 1. Note that the "time" or "times" referred to below represent a time period and time periods respectively, unless otherwise indicated.

Referring to FIG. 3, the image sensing device 100 may operate in the order of a reset time AA, integration times BB1, DD1, CC1, EE1, BB2, DD2, CC2 and EE2 and a readout time FF. For example, the first pixel TAPA may be reset during the reset time AA, and extract only reflected light by removing the background light from the incident light RS' during the integration times BB1, DD1, CC1, EE1, BB2, DD2, CC2 and EE2, and generate the first pixel signal PX1, which corresponds to the reflected light, during the readout time FF.

Particularly, the integration times BB1, DD1, CC1, EE1, BB2, DD2, CC2 and EE2 may include first and second emission times 661 and BB2, first and second reception times CC1 and CC2, first and second preparatory times DD1 and DD2 and first and second end times EE1 and EE2. The image sensing device 100 may operate in the order of the first emission time BB1, the first preparatory time DD1, the first reception time CC1, the first end time EE1, the second emission time BB2, the second preparatory time DD2, the second reception time CC2 and the second end time EE2.

Although it is described as an example herein that the emission time, the preparatory time, the reception time and the end time are repeated twice, the present invention is not limited thereto. More generally, the emission time, the preparatory time, the reception time and the end time may be repeated at least once, depending on design.

Operation of the image sensing device 100 according to the reset time AA, the first and second emission times BB1 and BB2, the first and second reception times CC1 and CC2 and the readout time FF illustrated in FIG. 3 is described below.

Figure 4:
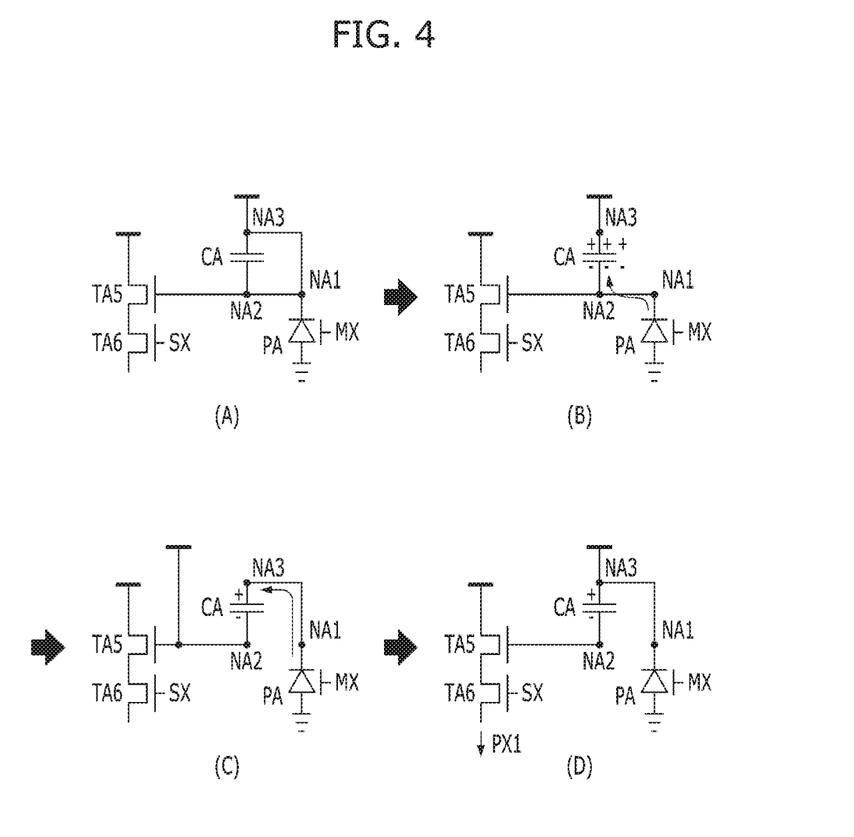
FIGS. 4 to 6 are diagrams further illustrating operation of an image sensing device, such as that illustrated in FIG. 3.

FIG. 4 is a circuit diagram illustrating an operation of the first pixel TAPA according to the reset time AA, the first and second emission times BB1 and BB2, the first and second reception times CC1 and CC2 and the readout time FF illustrated in FIG. 3.

Referring to FIG. 3 and (A) of FIG. 4, during the reset time AA, the reset signal RX and the first and second transmission signals TX and TC may be activated. The first transmission circuit TA1 may electrically couple the first node NA1 to the second node NA2 based on the activated first transmission signal TX, the second transmission circuit TA3 may electrically couple the first node NA1 to the third node NA3 based on the activated second transmission signal TC, and the first coupling circuit TA2 may electrically couple the high voltage terminal to the third node NA3 based on the activated reset signal RX. Accordingly, the sensing circuit PA, the charge storage circuit CA and the second node NA2 may be reset during the reset time AA. For example, charges remaining in the sensing circuit PA and the charge storage circuit CA may be discharged to the high voltage terminal, and the second node NA2 may be reset to the same level as the high voltage.

Referring to FIG. 3 and (B) of FIG. 4, during the first emission time BB1, the emitted light MS may be emitted to the subject 200, and the first incident light RS1 including the reflected light which is reflected from the subject 200 and the background light around and/or near the subject 200 may be received. The sensing circuit PA may generate the first charges, corresponding to the first received incident light RS1', based on the control signal MX. During the first emission time BB1, the first transmission signal TX and the reset signal RX may be activated. The first transmission circuit TA1 may electrically couple the first node NA1 to the second node NA2 based on the activated first transmission signal TX. The first coupling circuit TA2 may electrically couple the high voltage terminal to the third node NA3 based on the activated reset signal RX. Accordingly, the first charges may be transmitted to the charge storage circuit CA through the first and second nodes NA1 and NA2. The charge storage circuit CA may store the first charges. For example, negative (−) charges corresponding to the first charges may be accumulated at one terminal of the charge storage circuit CA, and thus positive (+) charges corresponding to the negative (−) charges may be accumulated at the other terminal of the charge storage circuit CA.

Referring to FIG. 3 and (C) of FIG. 4, during the first reception time CC1, the second incident light RS2 including only the background light may be received since the emitted light MS is not emitted to the subject 200. The sensing circuit PA may generate the second charges, corresponding to the second received incident light RS2', based on the control signal MX. During the first reception time CC1, the second transmission signal TC and the coupling signal RC may be activated. The second transmission circuit TA3 may electrically couple the first node NA1 to the third node NA3 based on the activated second transmission signal TC. The second coupling circuit TA4 may electrically couple the high voltage terminal to the second node NA2 based on the activated coupling signal RC. Accordingly, the second charges may be transmitted to the charge storage circuit CA through the first and third nodes NA1 and NA3. The charge storage circuit CA may subtract the second charges from the first charges. For example, as negative (−) charges corresponding to the second charges are accumulated at the other terminal of the charge storage circuit CA, the negative (−) charges and previously-accumulated positive (+) charges may be offset. Accordingly, a quantity of negative (−) charges, which are previously accumulated at one terminal of the charge storage circuit CA, corresponding to the quantity of the offset positive (+) charges vanishes. This is the same as a result obtained by removing the background light from the first incident light RS1. Accordingly, the negative (−) charges remaining at one terminal of the charge storage circuit CA may correspond to only the reflected light.

Since the operation of the image sensing device 100 according to the second emission time BB2 and the second reception time CC2 is the same as the operation of the image sensing device 100 according to the first emission time BB1 and the first reception time CC1 described above, detailed description thereon is omitted here.

Referring to FIG. 3 and (D) of FIG. 4, during the readout time FF, the reset signal RX and the second transmission signal TC may be activated. The first coupling circuit TA2 may electrically couple the high voltage terminal to the third node NA3 based on the activated reset signal RX, and the second transmission circuit TA3 may electrically couple the first node NA1 to the third node NA3 based on the activated second transmission signal TC. Accordingly, the first pixel signal PX1 corresponding to the voltage level loaded on the second node NA2 may be generated.

Next, the operation of the image sensing device 100 according to the first and second preparatory times DD1 and DD2 illustrated in FIG. 3 is described.

Figure 5:
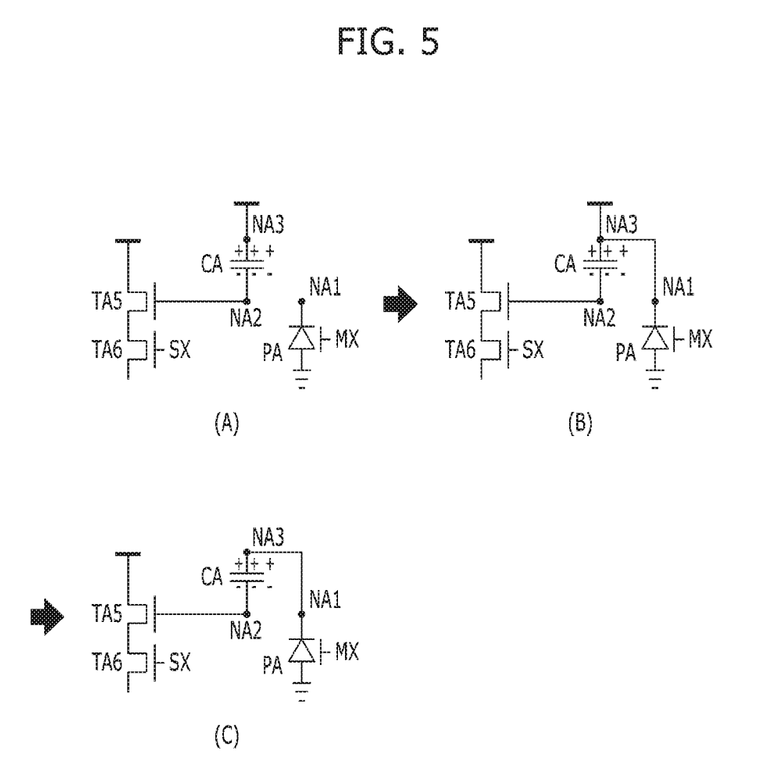

FIG. 5 is a circuit diagram illustrating an operation of the first pixel TAPA according to the first preparatory time DD1 illustrated in FIG. 3.

Referring to FIG. 3 and (A) of FIG. 5, during a first duration time D1 of the first preparatory time DD1, the reset signal RX may be activated, and the coupling signal RC and the first and second transmission signals TX and TC may be deactivated. The first coupling circuit TA2 may electrically couple the high voltage terminal to the third node NA3 based on the activated reset signal RX, the second coupling circuit TA4 may electrically decouple, i.e., separate, the high voltage terminal from the second node NA2 based on the deactivated coupling signal RC, the first transmission circuit TA1 may electrically decouple the first node NA1 from the second node NA2 based on the deactivated first transmission signal TX, and the second transmission circuit TA3 may electrically decouple the first node NA1 from the third node NA3 based on the deactivated second transmission signal TC.

Referring to FIG. 3 and (B) of FIG. 5, during a second duration time D2 of the first preparatory time DD1, the reset signal RX and the second transmission signal TC may be activated, and the coupling signal RC and the first transmission signal TX may be deactivated. The first coupling circuit TA2 may electrically couple the high voltage terminal to the third node NA3 based on the activated reset signal RX, the second transmission circuit TA3 may electrically couple the first node NA1 to the third node NA3 based on the activated second transmission signal TC, the second coupling circuit TA4 may electrically decouple the high voltage terminal from the second node NA2 based on the deactivated coupling signal RC, and the first transmission circuit TA1 may electrically decouple the first node NA1 from the second node NA2 based on the deactivated first transmission signal TX.

Referring to FIG. 3 and (C) of FIG. 5, during a third duration time D3 of the first preparatory time DD1, the second transmission signal TC may be activated, and the reset signal RX, the coupling signal RC and the first transmission signal TX may be deactivated. The second transmission circuit TA3 may electrically couple the first node NA1 to the third node NA3 based on the activated second transmission signal TC, the first coupling circuit TA2 may electrically decouple the high voltage terminal from the third node NA3 based on the deactivated reset signal RX, the second coupling circuit TA4 may electrically decouple the high voltage terminal from the second node NA2 based on the deactivated coupling signal RC, and the first transmission circuit TA1 may electrically decouple the first node NA1 from the second node NA2 based on the deactivated first transmission signal TX.

Since the operation of the image sensing device 100 according to the second preparatory time DD2 is the same as the operation of the image sensing device 100 according to the first preparatory time DD1 described above, detailed description thereon is omitted here.

Finally, the operation of the image sensing device 100 according to the first and second end times EE1 and EE2 illustrated in FIG. 3 is described.

Figure 6:
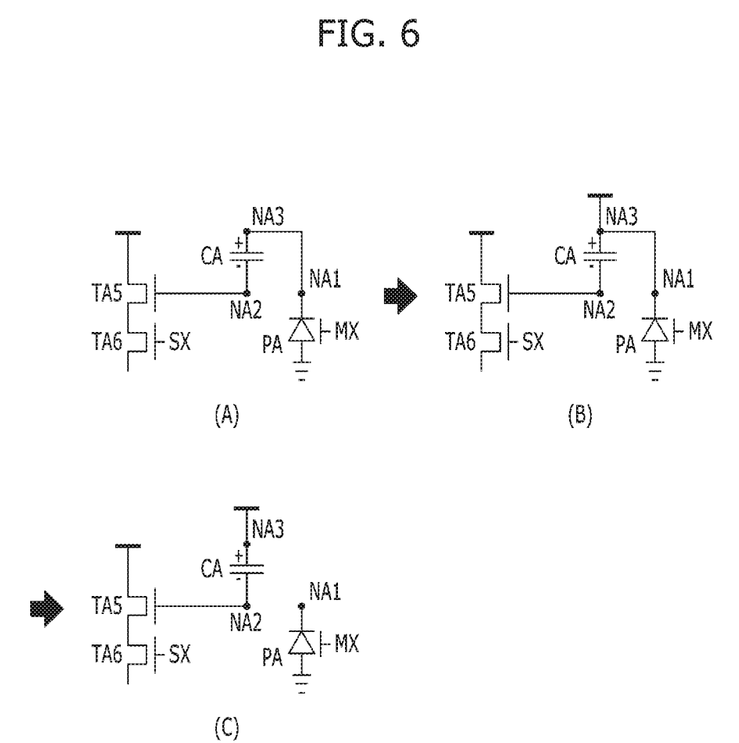

FIG. 6 is a circuit diagram illustrating an operation of the first pixel TAPA according to the first end time EE1 illustrated in FIG. 3.

Referring to FIG. 3 and (A) of FIG. 6, during a first duration time E1 of the first end time EE1, the second transmission signal TC may be activated, and the reset signal RX, the coupling signal RC and the first transmission signal TX may be deactivated. The second transmission circuit TA3 may electrically couple the first node NA1 to the third node NA3 based on the activated second transmission signal TC, the first coupling circuit TA2 may electrically decouple the high voltage terminal from the third node NA3 based on the deactivated reset signal RX, the second coupling circuit TA4 may electrically decouple the high voltage terminal from the second node NA2 based on the deactivated coupling signal RC, and the first transmission circuit TA1 may electrically decouple the first node NA1 from the second node NA2 based on the deactivated first transmission signal TX.

Referring to FIG. 3 and (B) of FIG. 6, during a second duration time E2 of the first end time EE1, the reset signal RX and the second transmission signal TC may be activated, and the coupling signal RC and the first transmission signal TX may be deactivated. The first coupling circuit TA2 may electrically couple the high voltage terminal to the third node NA3 based on the activated reset signal RX, the second transmission circuit TA3 may electrically couple the first node NA1 to the third node NA3 based on the activated second transmission signal TC, the second coupling circuit TA4 may electrically decouple the high voltage terminal from the second node NA2 based on the deactivated coupling signal RC, and the first transmission circuit TA1 may electrically decouple the first node NA1 from the second node NA2 based on the deactivated first transmission signal TX.

Referring to FIG. 3 and (C) of FIG. 6, during a third duration time E3 of the first end time EE1, the reset signal RX may be activated, and the coupling signal RC and the first and second transmission signals TX and TC may be deactivated. The first coupling circuit TA2 may electrically couple the high voltage terminal to the third node NA3 based on the activated reset signal RX, the second coupling circuit TA4 may electrically decouple, i.e., separate, the high voltage terminal from the second node NA2 based on the deactivated coupling signal RC, the first transmission circuit TA1 may electrically decouple the first node NA1 from the second node NA2 based on the deactivated first transmission signal TX, and the second transmission circuit TA3 may electrically decouple the first node NA1 from the third node NA3 based on the deactivated second transmission signal TC.

The second end time EE2 may include first and second duration times E1 and E2. Since the operation of the image sensing device 100 according to the first duration time E1 of the second end time EE2 is the same as the operation of the image sensing device 100 according to the first duration time E1 of the first end time EE1 described above, and the operation of the image sensing device 100 according to the second duration time E2 of the second end time EE2 is the same as the operation of the image sensing device 100 according to the second duration time E2 of the first end time EE1 described above, detailed description thereon is omitted here.

According to embodiments of the present disclosure, background light can be easily and advantageously removed in a pixel during an integration time. Also, as only two transistors, for example, TA3 and TA4, per pixel are used for removing the background light, the structure can be simplified.

According to embodiments of the present disclosure, as the background light is easily removed when a depth information signal is generated using a time of flight (ToF) technology, a more reliable depth information signal can be obtained.

In addition, as the structures of the circuits for removing the background light are simplified, the circuits can be easily integrated into a pixel.

While the present disclosure has been illustrated and described with respect to specific embodiments, the foregoing description is not intended to be restrictive. As those skilled in the art will recognize in light of the present disclosure aspects and features of the present invention may be achieved in various ways through substitution, change, and modification. The present invention encompasses all such variations that fall within the scope of the claims.

What is claimed is:
1. An image sensing device comprising:
   a light detection circuit coupled between a low voltage terminal and a first node;
   a first transmission circuit coupled between the first node and a second node, and suitable for transmitting first charges, which are generated from the light detection circuit, to the second node during a first time period in which emitted light is emitted to a subject;
   a storage circuit coupled between the second node and a third node;
   a first coupling circuit coupled between the third node and a high voltage terminal, and suitable for electrically coupling the high voltage terminal to the third node during the first time period;
   a second transmission circuit coupled between the third node and the first node, and suitable for transmitting second charges, which are generated from the light detection circuit, to the third node during a second time period in which the emitted light is not emitted to the subject; and a second coupling circuit coupled between the second node and the high voltage terminal, and suitable for electrically coupling the high voltage terminal to the second node during the second time period.

2. The image sensing device of claim 1, wherein the storage circuit stores the first charges during the first time period, and subtracts the second charges from the first charges during the second time period after the first time period.

3. The image sensing device of claim 1,
wherein the first charges correspond to reflected light, which is reflected from the subject, and background light, which is present in the periphery of the subject, and
wherein the second charges correspond to the background light.

4. The image sensing device of claim 1, further comprising a driving circuit coupled between the high voltage terminal and a readout line, and suitable for outputting a pixel signal, which corresponds to charges stored in the storage circuit, to the readout line during a third time period after the second time period.

5. The image sensing device of claim 1,
wherein at least one of the first and second transmission circuits and the first coupling circuit are enabled during a fourth time period before the first time period, and
wherein the light detection circuit and the storage circuit are reset to a high voltage during the fourth time period.

6. The image sensing device of claim 1,
wherein, during a first duration time period of a fifth time period between the first and second time periods, the first coupling circuit couples the high voltage terminal to the third node, the second coupling circuit decouples the high voltage terminal from the second node, the first transmission circuit decouples the first node from the second node, and the second transmission circuit electrically decouples the first node from the third node,
wherein, during a second duration time period of the fifth time period, the first coupling circuit couples the high voltage terminal to the third node, the second transmission circuit couples the first node to the third node, the second coupling circuit decouples the high voltage terminal from the second node, and the first transmission circuit decouples the first node from the second node, and
wherein, during a third duration time period of the fifth time period, the second transmission circuit couples the first node to the third node, the first coupling circuit decouples the high voltage terminal from the third node, the second coupling circuit decouples the high voltage terminal from the second node, and the first transmission circuit decouples the first node from the second node.

7. The image sensing device of claim 1,
wherein, during a first duration time period of a sixth time period, which occurs after the second time period, the second transmission circuit couples the first node to the third node, the first coupling circuit decouples the high voltage terminal from the third node, the second coupling circuit decouples the high voltage terminal from the second node, and the first transmission circuit decouples the first node from the second node, and
wherein, during a second duration time period of the sixth time period, the first coupling circuit couples the high voltage terminal to the third node, the second transmission circuit couples the first node to the third node, the second coupling circuit decouples the high voltage terminal from the second node, and the first transmission circuit decouples the first node from the second node.

8. The image sensing device of claim 7, wherein, during a third duration time period of the sixth time period, the first coupling circuit couples the high voltage terminal to the third node, the second coupling circuit decouples the high voltage terminal from the second node, the first transmission circuit decouples the first node from the second node, and the second transmission circuit electrically decouples the first node from the third node.

9. An image sensing device comprising:
a light emitter enabled during a first time period, and suitable for emitting emitted light to a subject during the first time period;
a light receiver enabled during the first time period and a second time periods, and suitable for receiving first incident light during the first time period and second incident light during the second time period; and
at least one pixel including a storage circuit coupled between a second node and a third node, and suitable for generating a pixel signal corresponding to charges of the storage circuit, wherein first charges corresponding to the first incident light are transmitted to the storage circuit through the second node and second charges corresponding to the second incident light are transmitted to the storage circuit through the third node.

10. The image sensing device of claim 9, wherein the pixel subtracts the second charges from the first charges and generates the pixel signal based on third charges corresponding to a subtraction result.

11. The image sensing device of claim 9, wherein the pixel includes:
a light detection circuit coupled between a low voltage terminal and a first node;
a first transmission circuit coupled between the first node and the second node, and suitable for transmitting the first charges, which are generated from the light detection circuit, to the second node during the first time period;
the storage circuit;
a first coupling circuit coupled between the third node and a high voltage terminal, and suitable for electrically coupling the high voltage terminal to the third node during the first time period;
a second transmission circuit coupled between the third node and the first node, and suitable for transmitting the second charges, which are generated from the light detection circuit, to the third node during the second time period;
a second coupling circuit coupled between the second node and the high voltage terminal, and suitable for electrically coupling the high voltage terminal to the second node during the second time; period and
a driving circuit coupled between the high voltage terminal and a readout line, and suitable for outputting a pixel signal, which corresponds to charges stored in the storage circuit, to the readout line during a third time period.

12. The image sensing device of claim 11,
wherein at least one of the first and second transmission circuits and the first coupling circuit are enabled during a fourth time period before the first time period, and wherein the light detection circuit and the storage circuit are reset to a high voltage during the fourth time period.

13. The image sensing device of claim 11,
wherein, during a first duration time period of a fifth time period, between the first and second time periods, the first coupling circuit couples the high voltage terminal to the third node, the second coupling circuit decouples the high voltage terminal from the second node, the first transmission circuit decouples the first node from the second node, and the second transmission circuit electrically decouples the first node from the third node,
wherein, during a second duration time period of the fifth time period, the first coupling circuit couples the high voltage terminal to the third node, the second transmission circuit couples the first node to the third node, the second coupling circuit decouples the high voltage terminal from the second node, and the first transmission circuit decouples the first node from the second node, and
wherein, during a third duration time period of the fifth time period, the second transmission circuit couples the first node to the third node, the first coupling circuit decouples the high voltage terminal from the third node, the second coupling circuit decouples the high voltage terminal from the second node, and the first transmission circuit decouples the first node from the second node.

14. The image sensing device of claim 11,
wherein, during a first duration time period of a sixth time period, which occurs after the second time period, the second transmission circuit couples the first node to the third node, the first coupling circuit decouples the high voltage terminal from the third node, the second coupling circuit decouples the high voltage terminal from the second node, and the first transmission circuit decouples the first node from the second node, and
wherein, during a second duration time period of the sixth time period, the first coupling circuit couples the high voltage terminal to the third node, the second transmission circuit couples the first node to the third node, the second coupling circuit decouples the high voltage terminal from the second node, and the first transmission circuit decouples the first node from the second node.

15. The image sensing device of claim 14, wherein during a third duration time period of the sixth time period, the first coupling circuit couples the high voltage terminal to the third node, the second coupling circuit decouples the high voltage terminal from the second node, the first transmission circuit decouples the first node from the second node, and the second transmission circuit electrically decouples the first node from the third node.

16. The image sensing device of claim 9,
wherein the first charges correspond to reflected light, which is reflected from the subject, and background light, which is present in the periphery of the subject, and
wherein the second charges only correspond to the background light.

17. An operating method of an image sensing device, comprising:
transmitting first charges, which are generated from a light detection circuit, to a second node coupled to one terminal of a storage circuit, during a first time period, in which emitted light is emitted to a subject;
storing the first charges, which are transmitted to the second node, in a storage circuit;
transmitting second charges, which are generated from the light detection circuit, to a third node coupled to the other terminal of the storage circuit, during a second time period, in which the emitted light is not emitted to the subject; and
subtracting the second charges, which are transmitted to the third node, from the first charges stored in the storage circuit.

18. The operating method of claim 17,
wherein the first charges correspond to reflected light, which is reflected from the subject, and background light, which is present in the periphery of the subject, and
wherein the second charges correspond to the background light.

19. The operating method of claim 17, further comprising generating a pixel signal during a third time period, based on third charges corresponding to a result obtained by the subtracting of the second charges from the first charges.

20. The operating method of claim 19, wherein the first time period occurs before the second time period, and the second time period occurs before the third time period.

* * * * *